3,475,297
METHOD OF MAKING BATTERY SEPARATORS
James M. McQuade, Fort Wayne, Ind., assignor to
General Electric Company, a corporation of New
York
No Drawing. Filed Aug. 8, 1966, Ser. No. 570,725
Int. Cl. C23b 11/00
U.S. Cl. 204—56                                6 Claims

ABSTRACT OF THE DISCLOSURE

A conductive element is provided with a thin adherent porous coating of a water-soluble salt of magnesium and inserted into an electrolytic cell for use as a battery electrode, the coating serving as a separator for the electrodes of the battery.

---

The present invention relates to a method of making battery separators and more particularly to an improved method of galvanically depositing such separators upon battery electrodes.

Application Ser. No. 489,059 filed Sept. 21, 1965 for Battery and Method of Making the Same by James M. McQuade relates to batteries having electrodeposited battery separators and an improved method for the electrodeposition of such separators on the battery electrodes. Some of the advantages of such a battery are reduced size, increased life and elimination of dendrite formations and migration of the electrode material.

The present invention provides a further novel method of manufacturing battery separators. More specifically, the present invention is directed to a method of producing a separator comprising a thin adherent porous coating upon the electrodes of a battery by galvanic deposition. Such a method produces a separator which is non-conductive, chemically inert, and of uniform thickness without the necessity of utilizing an external power source in the practice of the method.

An object of the present invention is the provision of a method of manufacturing a thin adherent porous battery separator by a deposition process eliminating the need for an external power supply.

Yet another object of this invention is the provision of a method for depositing a chemically inert, mechanically stable, and electrically non-conductive separator upon a battery electrode which obviates the need for a power supply in the practice of the method.

These and other objects of the present invention will become readily apparent from the following description.

The invention relates to a method of coating an electrode of an alkaline battery with a thin adherent layer of magnesium hydroxide by the galvanic hydrolysis of a water soluble magnesium salt.

Specifically, the method of coating the electrodes, in accordance with the present invention, comprises the galvanic deposition of a water soluble solution of magnesium acetate, magnesium nitrate, magnesium sulfate and magnesium chloride upon the battery electrodes in a galvanic cell.

In the practice of the present invention, the electrode to be coated serves as the cathode of the cell and an electrode of magnesium metal serves as the anode. An electrical path is established by the physical connection of a conductor between the anode and the cathode. An aqueous solution of a magnesium salt is utilized as the electrolyte which solution also serves to complete the electrical circuit path between the anode and the cathode.

Magnesium is anodic and the reduction of water yields hydrogen and a hydroxyl ion at the cathode. The increase of hydroxyl ions at the cathode-electrolyte interface results in the precipitation of magnesium hydroxide upon the cathodic electrode. The magnesium ions which combine with the hydroxyl ions become available from the magnesium salt electrolyte. Those ions of magnesium which precipitate are replaced into the electrolyte by the anodic reaction of the mass of magnesium metal. The electrochemical reaction which occurs is therefore:

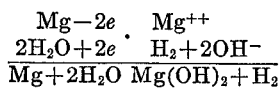

This process is essentially continuous. The amount of magnesium salt of the electrolyte will remain constant since magnesium ions are replaced therein from the anode. Only the periodic addition of water need occur to maintain the concentration of the electrolyte. No external power supply is necessary and magnesium oxide or magnesium hydroxide powder need not be added to the electrolyte.

Obviously it is necessary that the electrode to be coated, be cathodic to magnesium and be in its reduced form. If not, the cathode will be reduced instead of the water. The rate of deposition is dependent upon the current flow between the anodic and the cathodic electrodes which flow is a function of the hydrogen overvoltage of the electrode to be coated. The overvoltage may be controlled by varying the temperature of the galvanic bath.

A specific example of the process of the invention follows which is intended merely to illustrate a method of the invention and is not intended in any way to limit the invention beyond the scope of the appended claims.

A solution containing 30 g./liter of magnesium acetate was used to coat a silver electrode. The galvanic hydrolysis produced a 5 mil coating of magnesium hydroxide over a period of approximately 60 hours. The battery electrode was removed from the bath and charged to silver-oxide using a 31% solution of potassium hydroxide as an electrolyte. No apparent change has been noticed in the magnesium hydroxide coating.

Thus a new and improved method of producing battery separators has been fully disclosed.

Obviously many modifications and variations of the present invention are possible in light of the above teachings. It is therefore to be understood, that within the scope of the appended claims, the invention may be practiced otherwise than as specifically understood.

What is claimed and desired to be secured by Letters Patent of the United States is:

1. A method of applying a thin adherent porous coating to a battery electrode wherein said coating is utilized as a separator for the electrodes of said battery, the steps of forming and depositing said coating upon a conductive element which comprise the galvanic hydrolysis of a water soluble salt of magnesium, and inserting said conductive element with the porous coating thereon into an electrolytic cell for use as a battery electrode.

2. The method of claim 1 wherein said salt is one selected from the group consisting of magnesium acetate, magnesium nitrate, magnesium sulphate and magnesium chloride.

3. The method of claim 2 wherein said salt is magnesium acetate.

4. The method of claim 3 wherein said salt is magnesium chloride.

5. The method of claim 2 wherein said salt is magnesium nitrate.

6. The method of claim 2 wherein said salt is magnesium sulphate.

References Cited

UNITED STATES PATENTS 3,208,922  9/1965  McQuade _____ 204—56

HOWARD S. WILLIAMS, Primary Examiner

R. L. ANDREWS, Assistant Examiner